United States Patent
Chen et al.

(10) Patent No.: US 12,395,862 B2
(45) Date of Patent: Aug. 19, 2025

(54) APPARATUSES AND METHODS FOR CO-RECEPTION (CO-RX) OPERATION OF MULTIPLE TRANSCEIVER RADIOS SHARING THE SAME ANTENNA AND LOW NOISE AMPLIFIER (LNA)

(71) Applicant: MEDIATEK INC., Hsinchu (TW)

(72) Inventors: Li-Wei Chen, Hsinchu (TW);
Tsai-Yuan Hsu, Hsinchu (TW);
Chen-Feng Liu, Hsinchu (TW);
Wen-Ying Chien, Hsinchu (TW);
Chia-Hung Hsu, Hsinchu (TW);
Yu-Lin Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 382 days.

(21) Appl. No.: 17/854,074

(22) Filed: Jun. 30, 2022

(65) Prior Publication Data
US 2023/0012045 A1    Jan. 12, 2023

Related U.S. Application Data

(60) Provisional application No. 63/219,857, filed on Jul. 9, 2021.

(51) Int. Cl.
*H04W 24/00*  (2009.01)
*H04B 1/10*  (2006.01)

(52) U.S. Cl.
CPC .............. *H04W 24/00* (2013.01); *H04B 1/10* (2013.01)

(58) Field of Classification Search
CPC .................................. H04W 24/00; H04B 1/10
See application file for complete search history.

(56) References Cited

U.S. PATENT DOCUMENTS

| | | | |
|---|---|---|---|
| 8,055,230 B1 | 11/2011 | Bidichandani | |
| 8,155,612 B1 * | 4/2012 | Husted | H04B 1/406 |
| | | | 455/84 |
| 8,406,274 B1 | 3/2013 | Hirsch | |

(Continued)

FOREIGN PATENT DOCUMENTS

| | | |
|---|---|---|
| CN | 103190194 A | 7/2013 |
| KR | 20210067571 A | 6/2021 |

OTHER PUBLICATIONS

Chinese language office action dated Jan. 31, 2023, issued in application No. TW 111124907.

(Continued)

*Primary Examiner* — Kevin C. Harper
(74) *Attorney, Agent, or Firm* — McClure, Qualey & Rodack, LLP

(57) ABSTRACT

A method for Co-Reception (Co-Rx) operation of multiple transceiver radios sharing the same antenna and Low Noise Amplifier (LNA) is provided. A first receiver radio of a wireless communication device determines the first gain mode of an LNA based on the first signal indicator. A second receiver radio of the wireless communication device determines the second gain mode of the LNA based on the second signal indicator. The LNA is shared by the first receiver radio and the second receiver radio and is coupled to an antenna. A Packet Traffic Arbitration (PTA) circuitry of the wireless communication device configures the LNA to operate in the first gain mode or the second gain mode based on the priority levels of the first receiver radio and the second receiver radio.

16 Claims, 8 Drawing Sheets

(56) References Cited

U.S. PATENT DOCUMENTS

| | | |
|---|---|---|
| 8,489,024 B1 | 7/2013 | Yucek |
| 9,319,017 B1 | 4/2016 | Bidichandani et al. |
| 2012/0294398 A1* | 11/2012 | Yucek ................. H03G 3/3052 |
| | | 375/345 |
| 2013/0163643 A1* | 6/2013 | Hirsch ................ H04B 1/7156 |
| | | 375/137 |
| 2015/0094001 A1 | 4/2015 | Vaisanen et al. |
| 2019/0132013 A1 | 5/2019 | Sharma |
| 2023/0238986 A1* | 7/2023 | Ruan ....................... H04B 1/10 |
| | | 455/552.1 |
| 2024/0031935 A1* | 1/2024 | Li ..................... H04W 52/0245 |

OTHER PUBLICATIONS

Chinese language office action dated Sep. 25, 2024, issued in application No. CN 202210804291.4.

\* cited by examiner

APPARATUSES AND METHODS FOR CO-RECEPTION (CO-RX) OPERATION OF MULTIPLE TRANSCEIVER RADIOS SHARING THE SAME ANTENNA AND LOW NOISE AMPLIFIER (LNA)

CROSS REFERENCE TO RELATED APPLICATIONS

This application claims priority under 35 U.S.C. § 119 from U.S. Provisional Application No. 63/219,857, entitled "Multiple Radio Packet Co-Receiving Mechanism", filed on Jul. 9, 2021, the subject matter of which is incorporated herein by reference.

BACKGROUND OF THE APPLICATION

Field of the Application

The application generally relates to mobile communications, and more particularly, to apparatuses and methods for Co-Reception (Co-Rx) operation of multiple transceiver radios sharing the same antenna and Low Noise Amplifier (LNA).

Description of the Related Art

For the user's convenience and flexibility, most wireless communication devices nowadays are equipped with multiple transceiver radios for supporting different wireless technologies. For example, a wireless communication device may include a Wireless-Fidelity (Wi-Fi) transceiver radio for communicating with an Access Point (AP), and a Bluetooth (BT) transceiver radio for communicating with a headset. Such a wireless communication device may receive voice-call data or digital media data from the Internet via the Wi-Fi transceiver radio, and then forward the data to the BT headset via the BT transceiver radio.

To support both the Wi-Fi technology and the BT technology, a wireless communication device should include two separate transceiver radios (i.e., a Wi-Fi transceiver radio and a BT transceiver radio), and for cost consideration, some components, such as antenna and a Low Noise Amplifier (LNA), may be shared by these transceiver radios. Specifically, in a two-stage signal amplification design for Co-Rx operation, two transceiver radios may share an external LNA for first-stage signal amplification, and then the second-stage LNA in each transceiver radio may perform the final signal amplification and adjustment. However, this hardware design may have some drawbacks, one of which is that when the shared antenna is occupied by one transceiver radio, the other transceiver radio may not be able to perform Transmission/Reception (Tx/Rx) operation simultaneously. For example, in the situations where both transceiver radios need to use the shared antenna for Rx operation, if these two transceiver radios require different gain modes of the LNA, then only one transceiver radio is allowed to operate the LNA in its desired gain mode.

Therefore, it is desirable to have a robust and efficient way of controlling the shared LNA to improve the overall throughput of the Co-Rx operation.

BRIEF SUMMARY OF THE APPLICATION

The present application proposes a per-packet LNA control mechanism which allows a wireless communication device with multiple transceiver radios to realize per-packet control over the gain mode of the shared LNA based on the priority levels of the transceiver radios. Advantageously, the shared LNA can be efficiently used in the Co-Rx operation to improve the overall Rx throughput.

In a first aspect of the application, a method is provided as follows. A first receiver radio of a wireless communication device determines a first gain mode of an LNA based on a first signal indicator. A second receiver radio of the wireless communication device determines a second gain mode of the LNA based on a second signal indicator, wherein the LNA is shared by the first receiver radio and the second receiver radio and is coupled to an antenna. A Packet Traffic Arbitration (PTA) circuitry of the wireless communication device configures the LNA to operate in the first gain mode or the second gain mode based on priority levels of the first receiver radio and the second receiver radio.

In one example of the first aspect of the application, the PTA circuitry grants only the first receiver radio to access the LNA in response to the LNA being configured to operate in the first gain mode, and grants only the second receiver radio to access the LNA in response to the LNA being configured to operate in the second gain mode.

In one example of the first aspect of the application, the configuring of the LNA to operate in the first gain mode or the second gain mode comprises: configuring, by the PTA circuitry, the LNA to switch to the first gain mode in response to the priority level of the first receiver radio being higher than the priority level of the second receiver radio; configuring, by the PTA circuitry, the LNA to switch to the second gain mode in response to the priority level of the second receiver radio being higher than the priority level of the first receiver radio; and configuring, by the PTA circuitry, the LNA to stay in its current gain mode whether it be the first gain mode or the second gain mode, in response to the priority level of the first receiver radio being equal to the priority level of the second receiver radio.

In one example of the first aspect of the application, the configuring of the LNA to operate in the first gain mode or the second gain mode is performed in response to the first gain mode being different from the second gain mode.

In one example of the first aspect of the application, the PTA circuitry grants both the first receiver radio and the second receiver radio to access the LNA simultaneously, in response to the first gain mode being the same as the second gain mode.

In one example of the first aspect of the application, the first receiver radio is a Wi-Fi receiver radio, and the second receiver radio is a BT receiver radio. The first signal indicator is a Received Signal Strength Indicator (RSSI), a Signal-to-Noise Ratio (SNR), or a Packet Error Rate (PER) of a Wi-Fi packet detected by the first receiver radio, and the second signal indicator is an RSSI, an SNR, or a PER of a BT packet detected by the second receiver radio.

In one example of the first aspect of the application, the determining of the first gain mode and the second gain mode and the configuring of the LNA to operate in the first gain mode or the second gain mode are performed on a per-packet basis.

In a second aspect of the application, a method is provided as follows. A first receiver radio of a wireless communication device detects a plurality of first packets, wherein the first packets are detected with strong signal indicators and weak signal indicators in an alternate order. A second receiver radio of the wireless communication device detects a plurality of second packets, wherein the second packets are all detected with strong signal indicators. The first receiver radio is allowed to successfully receive all the first packets via an LNA shared by the first receiver radio and the second receiver radio, when the first packets overlap with the second packets in time.

In one example of the second aspect of the application, the first packets are Wi-Fi packets, and the second packets are BT scan response packets.

In one example of the second aspect of the application, each of the first packets is associated with a respective Sequence Number (SN), and the first packets with SNs of 1, 3, and 5 have strong signal indicators, while the first packets with SNs of 2, 4, and 6 have weak signal indicators.

In one example of the second aspect of the application, the LNA is configured to operate in a low-gain mode for receiving the first packets with strong signal indicators, and to operate in a high-gain mode for receiving the first packets with weak signal indicators.

Other aspects and features of the present application will become apparent to those with ordinary skill in the art upon review of the following descriptions of specific embodiments of the apparatuses and methods for Co-Rx operation of multiple transceiver radios sharing the same antenna and LNA.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
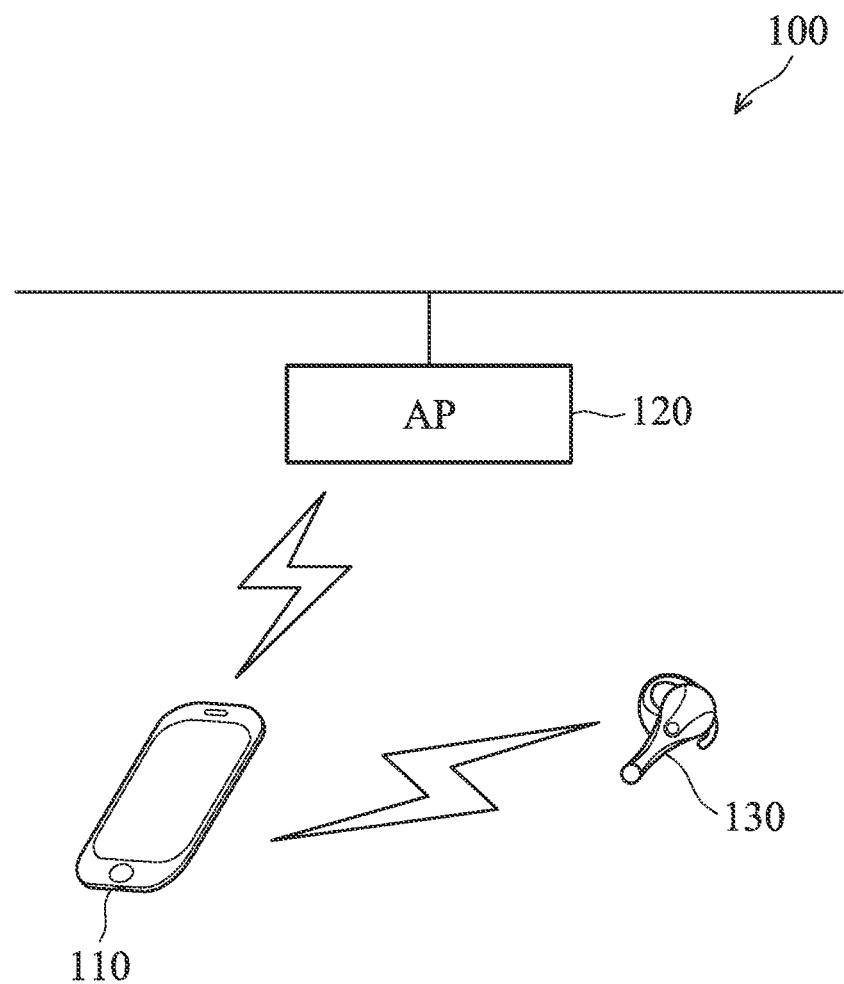
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a wireless communication device 110, an AP 120, and a peer terminal 130.

The wireless communication device 110 may be a feature phone, a smartphone, a desktop computer, a laptop computer, a tablet Personal Computer (PC), a workstation, or any wireless communication device supporting the wireless technologies utilized by the AP 120 and the peer terminal 130. Specifically, the wireless communication device 110 at least includes two transceiver radios to communicate with the AP 120 and the peer terminal 130 simultaneously or separately.

The AP 120 may use one wireless technology, such as the Wi-Fi technology in compliance with the Institute of Electrical and Electronics Engineers (IEEE) 802.11 standards, to establish a Wireless Local Area Network (WLAN) supporting bi-directional communication with the wireless communication device 110. Generally, a WLAN is established inside buildings as an extension to wired local area networks and is able to provide the last few meters of connectivity between a wired network and the wireless communication device 110. The AP 120 typically receives, buffers, and transmits data between the established WLAN and the wired network infrastructure. A WLAN may have a coverage varying from 20 meters in an area with obstacles (walls, stairways, elevators, etc.) to 100 meters in an area with a clear line of sight. For example, the wireless communication device 010 may receive web-browsing data from the Internet and transmit data to the Internet through the AP 110.

The peer terminal 130 may use another wireless technology, such as the BT technology, to establish a Personal Area Network (PAN) supporting bi-directional communication with the wireless communication device 110. The BT technology is an open wireless protocol for exchanging data over short distances. The peer terminal 130 may be a headset (as depicted in FIG. 1), a wearable device (e.g., a smart watch), or a peripheral devices (e.g., a keyboard, a mouse, a speaking, or a sensor).

In accordance with one novel aspect, the transceiver radios in the wireless communication device 110 share the same antenna and an external LNA, and the wireless communication device 110 also includes a Packet Traffic Arbitration (PTA) circuitry which collects the Rx request information (including desired gain mode of the shared LNA) from the transceiver radios and determines, on a per-packet basis, which transceiver radio gets to access the shared LNA with the desired gain mode for Rx operation.

Figure 2:
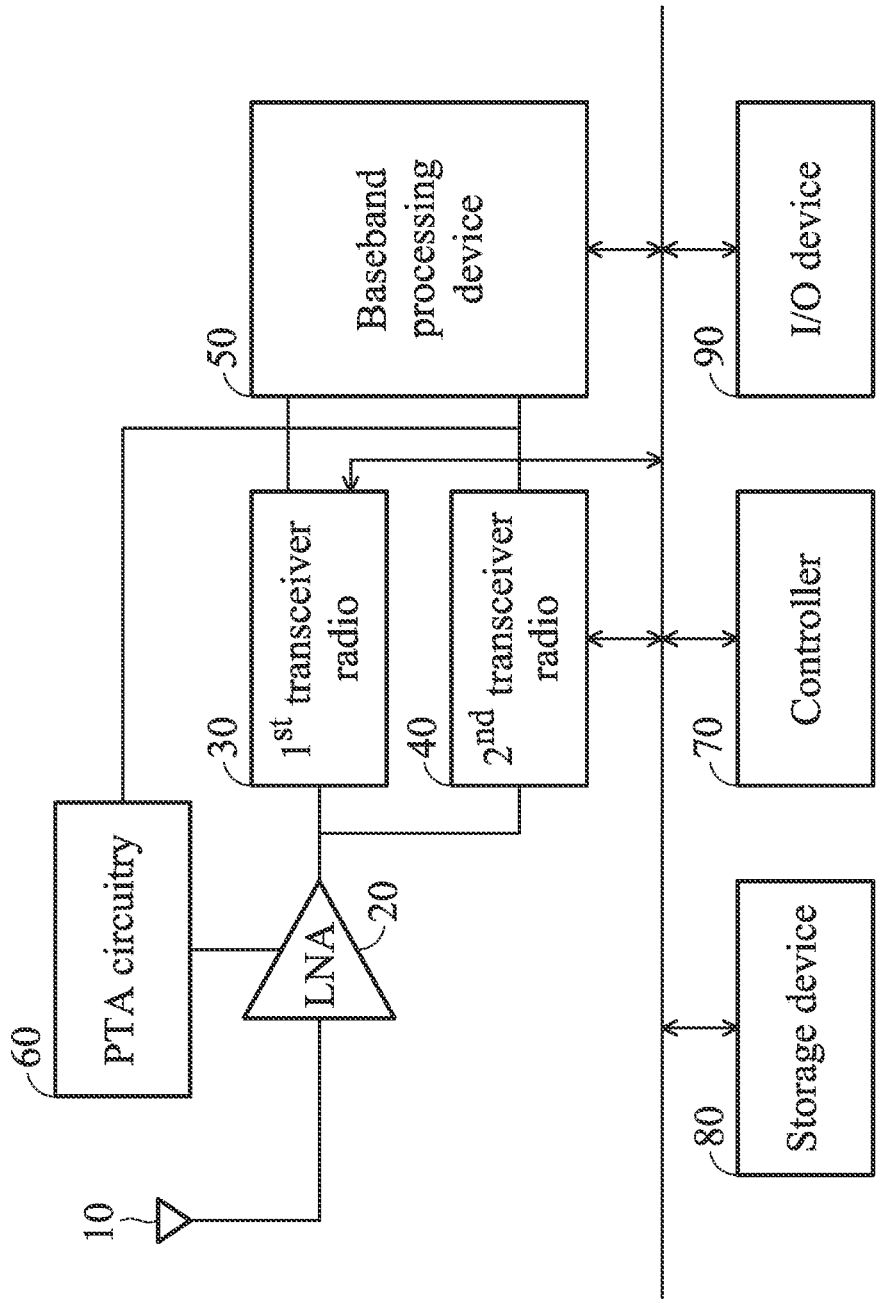
FIG. 2 is a block diagram illustrating a wireless communication device according to an embodiment of the application.

FIG. 2 is a block diagram illustrating a wireless communication device according to an embodiment of the application.

As shown in FIG. 2, a wireless communication device (e.g., the wireless communication device 110) may include an antenna 10, an LNA 20, two transceiver radios 30 and 40, a baseband processing device 50, a PTA circuitry 60, a controller 70, a storage device 80, and an Input/Output (I/O) device 90.

The LNA 20 (or called first-stage LNA) may perform first-stage signal amplification on the Radio Frequency (RF) wireless signals received from the antenna 10 and pass the processed RF wireless signals to the transceiver radio 30 and/or the transceiver radio 40. Specifically, the LNA 20 may operate in either a high-gain mode or a low-gain mode as instructed by the PTA circuitry 60 to carry out the first-stage signal amplification. When operating in the high-gain mode, the LNA 20 may supply a high power gain to low-power signals (e.g., signals with RSSI=−98~−50 dBm). When operating in the low-gain mode, the LNA 20 may supply a low power gain to high-power signals (e.g., signals with RSSI=−50~−6 dBm). The later power gain supplied by the LAN 20 may be determined based on the current RSSI.

Each of the transceiver radios 30 and 40 may receive the processed RF wireless signals from the LNA 20 and convert the signals to baseband signals which are later processed by the baseband processing device 50, or receive baseband signals from the baseband processing device 50 and convert the baseband signals to RF wireless signals which are later transmitted via the antenna 10. Each of the transceiver radios 30 and 40 may contain multiple hardware devices to perform radio frequency conversion in Rx and/or Tx operations. That is, each of the transceiver radios 30 and 40 can be understood as a hybrid component of Rx and Tx radio modules. For example, each of the transceiver radios 30 and 40 may include a respective LNA (or called second-stage LNA) to perform final signal amplification and adjustment, and a mixer to multiply the baseband signals with a carrier oscillated in the radio frequency of the supported wireless technology, wherein the radio frequency may be 2.4 GHz utilized in the Wi-Fi technology and the BT technology, or may be 5 GHz utilized in the Wi-Fi technology, or another radio frequency, depending on the wireless technology in use.

In particular, each of the transceiver radios 30 and 40 may detect a data packet (e.g., Wi-Fi packet or BT packet) based on the received RF wireless signal, and determine the signal indicator (e.g., a Received Signal Strength Indicator (RSSI), a Signal-to-Noise Ratio (SNR), or a Packet Error Rate (PER), etc.) of the data packet. After that, the transceiver radios 30 and 40 may each determine the desired gain mode of the LNA (i.e., the gain mode in which the transceiver radio 30/40 wishes to operate the LNA), and send an Rx request including the desired gain mode to the PTA circuitry 60. For example, if the RSSI of a detected Wi-Fi packet is very weak (e.g., −85 dBm), the desired gain mode may be the high-gain mode; or if the RSSI of a detected BT packet is very strong (e.g., −25 dBm), the desired gain mode may be the low-gain mode.

The baseband processing device 50 may perform baseband signal processing, including Analog-to-Digital Conversion (ADC)/Digital-to-Analog Conversion (DAC), gain adjusting, modulation/demodulation, encoding/decoding, and so on. The baseband processing device 50 may contain multiple hardware components to perform the baseband signal processing. For example, the baseband processing device 50 may include a digital processor (or called baseband processor).

The PTA circuitry 60 may receive the Rx request information, including desired gain mode (e.g., high-gain mode or low-gain mode) of the LNA 20, from the transceiver radios 30 and 40, and determines, on a per-packet basis, which transceiver radio gets to access the LNA 20 with the desired gain mode for Rx operation.

The controller 70 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the transceiver radios 30~40 and baseband processing device 50 for wireless communication with the AP 120 and the peer terminal 130, storing and retrieving data to and from the storage device 80, and receiving user inputs or outputting signals via the I/O device 90.

As will be appreciated by persons skilled in the art, the circuits of the controller 70 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, Operating System (OS), and/or communication protocols.

The I/O device 90 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a wireless communication device may include more components, such as a display device, and/or an additional baseband processing device. The display device may include a Liquid-Crystal Display (LCD), a Light-Emitting Diode (LED) display, an Organic LED (OLED) display, or an Electronic Paper Display (EPD), etc., for providing a display function. The additional baseband processing device may provide the function of baseband signal processing just for one of the transceiver radios 30~40, while the baseband processing device 50 may provide the function of baseband signal processing just for the other one of the transceiver radios 30~40.

Figure 3:
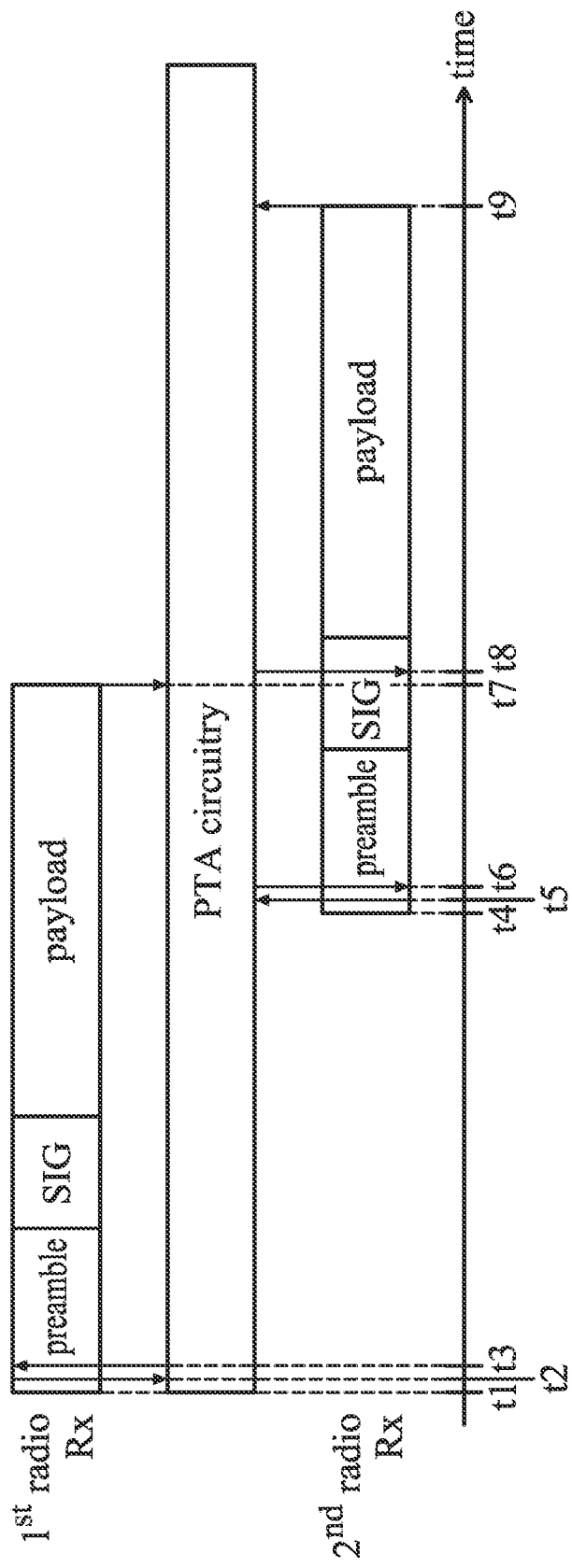
FIG. 3 is a schematic diagram illustrating the Co-Rx operation of multiple transceiver radios according to an embodiment of the application.

FIG. 3 is a schematic diagram illustrating the Co-Rx operation of multiple transceiver radios according to an embodiment of the application.

At time t1, the first transceiver radio (e.g., a Wi-Fi transceiver radio) detects a data packet (e.g., a Wi-Fi packet including a preamble, a signal-field (SIG), and a payload). In response to the detected data packet, the first transceiver radio determines the signal indicator (e.g., the RSSI) of the packet and the desired gain mode of the LNA based on the signal indicator.

At time t2, the first transceiver radio sends an Rx request with the desired gain mode to the PTA circuitry. In one example, the Rx request may include a "WF_Rx_Req" parameter and a "WF_DES_GainMode" parameter, wherein the "WF_Rx_Req" parameter indicates that the Wi-Fi transceiver radio requests an Rx operation, and the "WF_DES_GainMode" parameter indicates the desired gain mode of the LNA. In another example, the "WF_Rx_Req" parameter and the "WF_DES_GainMode" parameter may be sent separately in different signals to the PTA circuitry.

At time t3, the PTA circuitry grants the Rx request from the first transceiver radio since the LNA is not occupied by any transceiver radio now. In response to granting the Rx request, the PTA circuitry configures the LNA to operate in the desired gain mode indicated in the Rx request from the first transceiver radio, and then replies to the first transceiver radio with a grant signal indicating that the Rx request is granted.

Once the first transceiver radio receives the grant signal, it may access the LNA to receive the packet until time t4.

At time t4, the second transceiver radio (e.g., a BT transceiver radio) detects a data packet (e.g., a BT packet including a preamble, a signal-field (SIG), and a payload). In response to the detected data packet, the second transceiver radio determines the signal indicator (e.g., the RSSI) of the packet and the desired gain mode of the LNA based on the signal indicator.

At time t5, the second transceiver radio sends an Rx request with the desired gain mode to the PTA circuitry. In one example, the Rx request may include a "BT_Rx_Req" parameter and a "BT_DES_GainMode" parameter, wherein the "BT_Rx_Req" parameter indicates that the BT transceiver radio requests an Rx operation, and the "BT_DES_GainMode" parameter indicates the desired gain mode of the LNA. In another example, the "BT_Rx_Req" parameter and the "BT_DES_GainMode" parameter may be sent separately in different signals to the PTA circuitry.

At time t6, the PTA circuitry determines whether or not to grant the Rx request from the second transceiver radio based on the priority levels of the two transceiver radios. The priority levels of the two transceiver radios may be predetermined, e.g., default values which are pre-set after the wireless communication device is enabled or provided by the transceiver radios, e.g., via the Rx requests. In addition, the priority levels of the two transceiver radios may be set by detecting the current environment or set based on the command from the user. In response to the determination result, the PTA circuitry may or may not need to configure the LNA to switch to another gain mode, and then reply to the second transceiver radio with a grant/reject signal indicating that the Rx request is granted or rejected.

In one example, if WF_DES_GainMode is different from BT_DES_GainMode and the priority level of the second transceiver radio is higher than the first transceiver radio, then the PTA circuitry needs to configure the LNA to switch to the desired gain mode indicated by BT_DES_GainMode and replies to the second transceiver radio with a grant signal. Once the second transceiver radio receives the grant signal, it may access the LNA to receive the packet until the next packet detection occurs in the first transceiver radio. Meanwhile, the PTA circuitry may need to send a reject signal to the first transceiver radio to invalidate the previously issued grant, causing the first transceiver radio to yield the access of the LNA to the second transceiver radio.

In another example, if WF_DES_GainMode is the same as BT_DES_GainMode, then the PTA circuitry does not need to configure the LNA to switch gain mode (i.e., stay in the current gain mode) and replies to the second transceiver radio with a grant signal.

In yet another example, if WF_DES_GainMode is different from BT_DES_GainMode and the priority level of the first transceiver radio is higher than or equal to the second transceiver radio, then the PTA circuitry does not need to configure the LNA to switch gain mode (i.e., stay in the current gain mode) and replies to the second transceiver radio with a reject signal.

At time t7, the first transceiver radio may send an Rx complete signal to the PTA circuitry if the Rx request of the second transceiver radio is not granted at time t6.

At time t8, if an Rx complete signal is received from the first transceiver radio, the PTA circuitry may configure the LNA to switch to the desired gain mode indicated by BT_DES_GainMode, and send a grant signal to the second transceiver radio.

At time t9, the second transceiver radio may send an Rx complete signal to the PTA circuitry if the Rx request of the second transceiver radio is granted at time t6 or t8.

Figure 4:
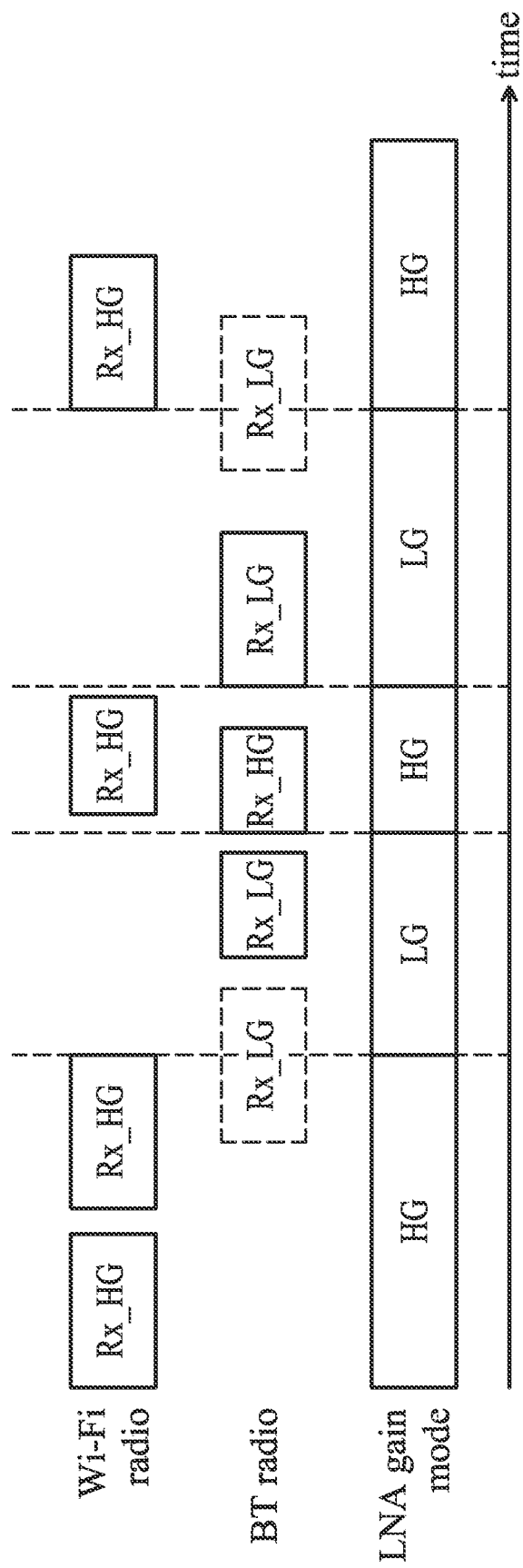
FIG. 4 is a schematic diagram illustrating the per-packet LNA control for Co-Rx operation according to an embodiment of the application.

FIG. 4 is a schematic diagram illustrating the per-packet LNA control for Co-Rx operation according to an embodiment of the application. In FIG. 4, Rx_HG means the desired gain mode requested by the transceiver radio is high-gain mode and Rx_LG means the desired gain mode requested by the transceiver radio is low-gain mode.

In this embodiment, it is assumed that the priority level of the Wi-Fi transceiver radio is higher than the priority level of the BT transceiver radio.

As shown in FIG. 4, the gain mode of the shared LNA is configured in favor of the desired gain mode requested by the Wi-Fi transceiver radio. As a result, the Wi-Fi transceiver radio always wins in each arbitration of Co-Rx operation, i.e., all Rx operations of the Wi-Fi transceiver radio are successful. On the other hand, the Rx operations of the BT transceiver radio are mostly successful if both the BT transceiver radio and the Wi-Fi transceiver radio request the same gain mode of the shared LNA, or if the Wi-Fi transceiver radio is idle. Otherwise, if the BT transceiver radio and the Wi-Fi transceiver radio request different gain modes of the shared LNA, the Rx operation of the BT transceiver radio will fail (denoted as dotted boxes).

Figure 5:
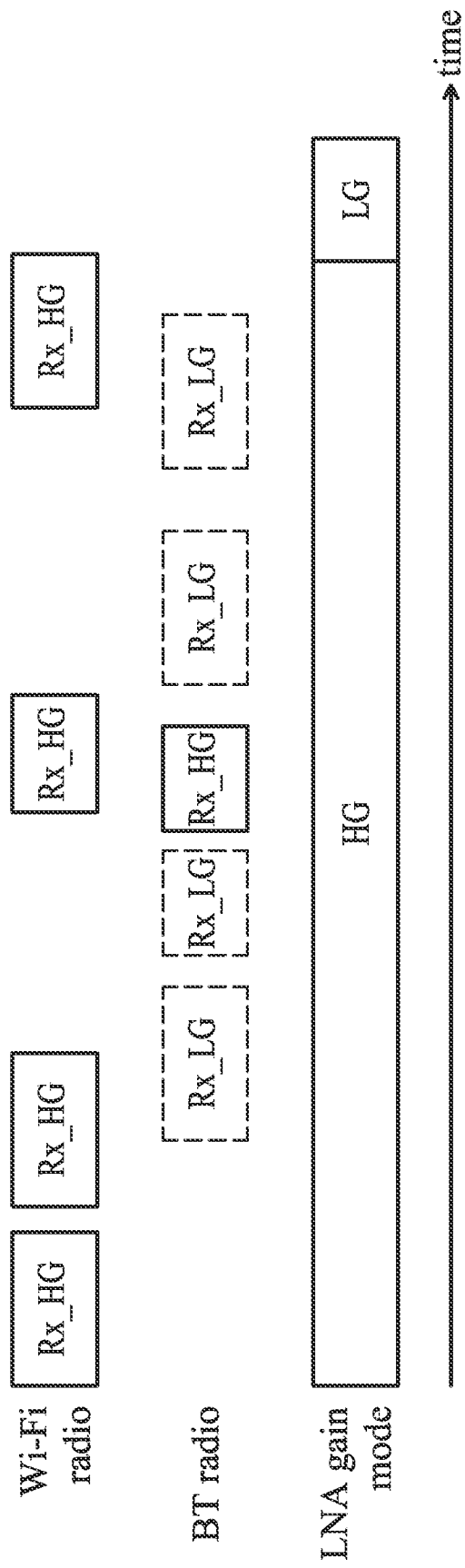
FIG. 5 is a schematic diagram illustrating the cycle-based LNA control for Co-Rx operation according to a conventional practice.

FIG. 5 is a schematic diagram illustrating the cycle-based LNA control for Co-Rx operation according to a conventional practice. In FIG. 5, Rx_HG means the desired gain mode requested by the transceiver radio is high-gain mode and Rx_LG means the desired gain mode requested by the transceiver radio is low-gain mode.

As shown in FIG. 5, the gain mode of the share LNA is configured to switch between the high-gain mode and the low-gain mode repeatedly in a cycle-based manner. When the share LNA is operating in the high-gain mode, only the Rx operations requiring high-gain mode of the share LAN may be performed successfully in both the Wi-Fi transceiver radio and the BT transceiver radio. In the scenario of FIG. 5, the RSSIs of the Wi-Fi packets remain high, while the RSSIs of the BT packets change frequently. As a result, the Rx operations of the Wi-Fi transceiver radio are all successful during the time the share LAN is operating in the high-gain mode, since the desired gain mode is the same as the current gain mode of the share LNA. On the other hand, most of the Rx operations of the BT transceiver radio fail due to the desired gain mode mostly being different from the current gain mode of the shared LNA.

It should be appreciated that, in contrast to the conventional practice of FIG. 5, the embodiment of FIG. 4 in the present application may achieve a better success rate for the Co-Rx operation.

Figure 6:
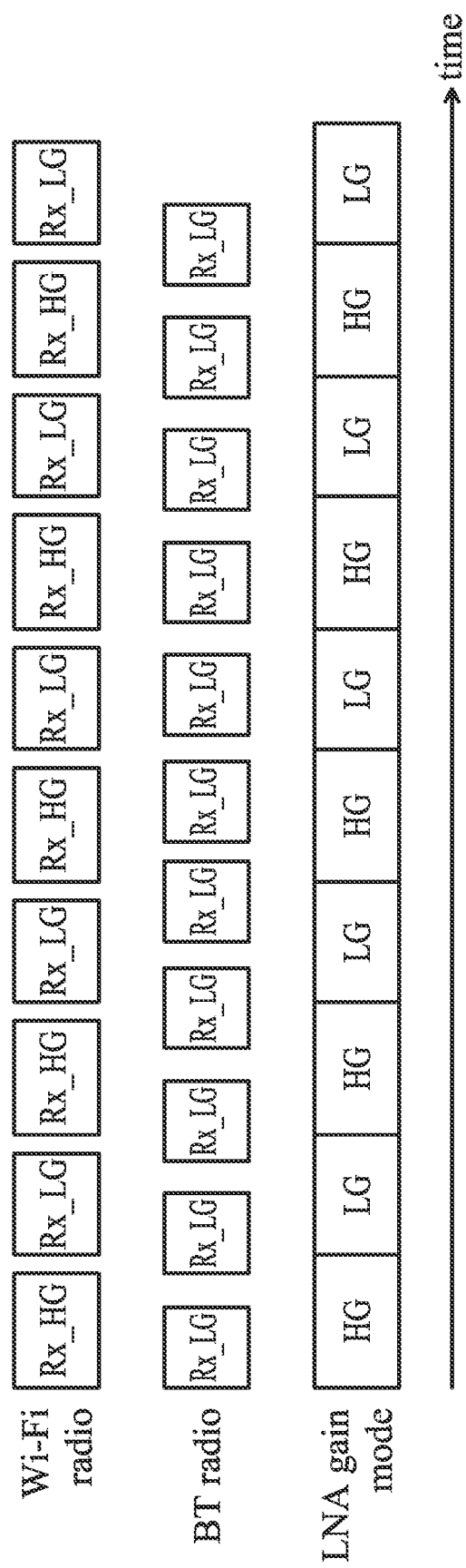
FIG. 6 is a schematic diagram illustrating the Co-Rx operation of multiple transceiver radios according to another embodiment of the application.

FIG. 6 is a schematic diagram illustrating the Co-Rx operation of multiple transceiver radios according to another embodiment of the application. In FIG. 6, Rx_HG means the desired gain mode requested by the transceiver radio is high-gain mode and Rx_LG means the desired gain mode requested by the transceiver radio is low-gain mode.

It should be understood that the embodiment of FIG. 6 is similar to the embodiment of FIG. 3, except that the embodiment of FIG. 3 spans a shorter period of time and the embodiment of FIG. 6 spans a longer period of time.

In this embodiment, it is assumed that the priority level of the Wi-Fi transceiver radio is higher than the BT transceiver radio. As to the traffic patterns, the Wi-Fi packets are detected with strong RSSIs and weak RSSIs in an alternate order, and the BT packets are all detected with strong RSSIs. Therefore, the gain mode of the shared LNA may follow the alternate order as the RSSIs of the detected Wi-Fi packets.

Specifically, the Wi-Fi transceiver radio may connect to an AP which is configured to send the Wi-Fi packets in a way that the Wi-Fi packets with Sequence Number (SN)=1, 3, 5 are sent with a high power level (i.e., the Wi-Fi transceiver radio may detect such Wi-Fi packets with strong RSSIs), and the Wi-Fi packets with SN=2, 4, 6 are sent with a low power level (i.e., the Wi-Fi transceiver radio may detect such Wi-Fi packets with weak RSSIs).

The BT transceiver radio may be configured to keep sending BT scan packets to discover any peer terminal, while a peer terminal may be configured to reply to the BT transceiver radio with BT scan response packets using a high power level (i.e., the BT transceiver radio may detect such BT scan response packets with strong RSSIs).

As shown in FIG. 6, arbitration of which transceiver radio should get the access to the shared LAN is performed in a per-packet basis, since the Wi-Fi packets overlap with the BT scan response packets in time. Due to the priority level of the Wi-Fi transceiver radio being higher than the BT transceiver radio, the Wi-Fi transceiver radio always wins the arbitration. That is, the shared LAN is configured to operate in whatever the gain mode that the Wi-Fi transceiver radio desires, to allow the Wi-Fi transceiver radio to receive all the Wi-Fi packets successfully. Different types of packets may have different priority levels.

Figure 7:
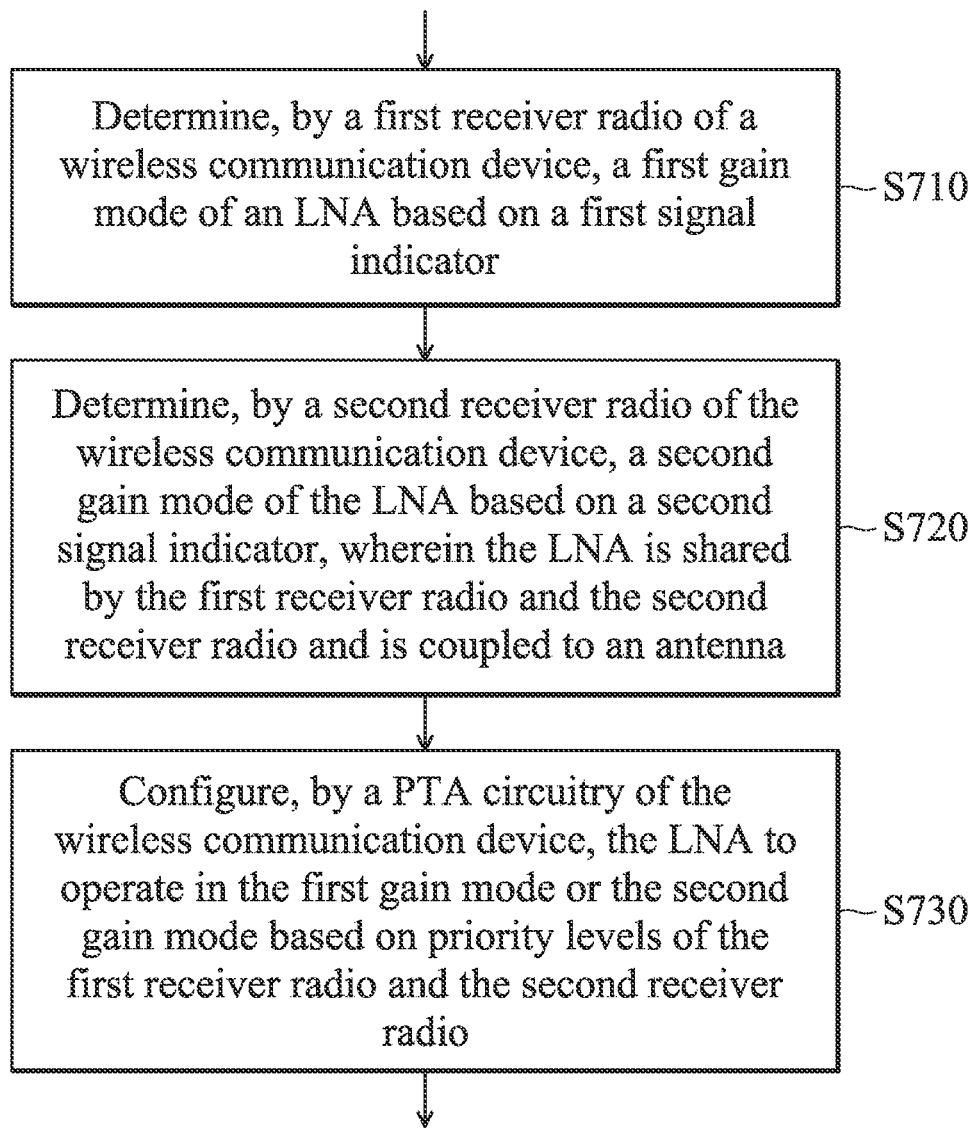
FIG. 7 is a flow chart illustrating the method for Co-Rx operation of multiple transceiver radios sharing the same antenna and LNA according to an embodiment of the application.

FIG. 7 is a flow chart illustrating the method for Co-Rx operation of multiple transceiver radios sharing the same antenna and LNA according to an embodiment of the application.

In step S710, a first receiver radio of a wireless communication device determines a first gain mode of a LNA based on a first signal indicator. In one example, the first receiver radio may be a Wi-Fi receiver radio, and the first signal indicator may include the RSSI, SNR, or PER of a Wi-Fi packet detected by the first receiver radio.

In step S720, a second receiver radio of the wireless communication device determines a second gain mode of the LNA based on a second signal indicator, wherein the LNA is shared by the first receiver radio and the second receiver radio and is coupled to an antenna. In one example, the second receiver radio may be a BT receiver radio, and the second signal indicator may include the RSSI, SNR, or PER of a BT packet detected by the second receiver radio.

In step S730, a PTA circuitry of the wireless communication device configures the LNA to operate in the first gain mode or the second gain mode based on priority levels of the first receiver radio and the second receiver radio. In one example, the PTA circuitry may configure the LNA to switch to the first gain mode in response to the priority level of the first receiver radio being higher than the priority level of the second receiver radio. In another example, the PTA circuitry may configure the LNA to switch to the second gain mode in response to the priority level of the second receiver radio being higher than the priority level of the first receiver radio. In yet another example, the PTA circuitry may configure the LNA to stay in its current gain mode whether it be the first gain mode or the second gain mode, in response to the priority level of the first receiver radio being equal to the priority level of the second receiver radio.

Based on the configured gain mode of the LNA, the PTA circuitry may grant only the first receiver radio to access the LNA in response to the LNA being configured to operate in the first gain mode, or grant only the second receiver radio to access the LNA in response to the LNA being configured to operate in the second gain mode.

Figure 8:
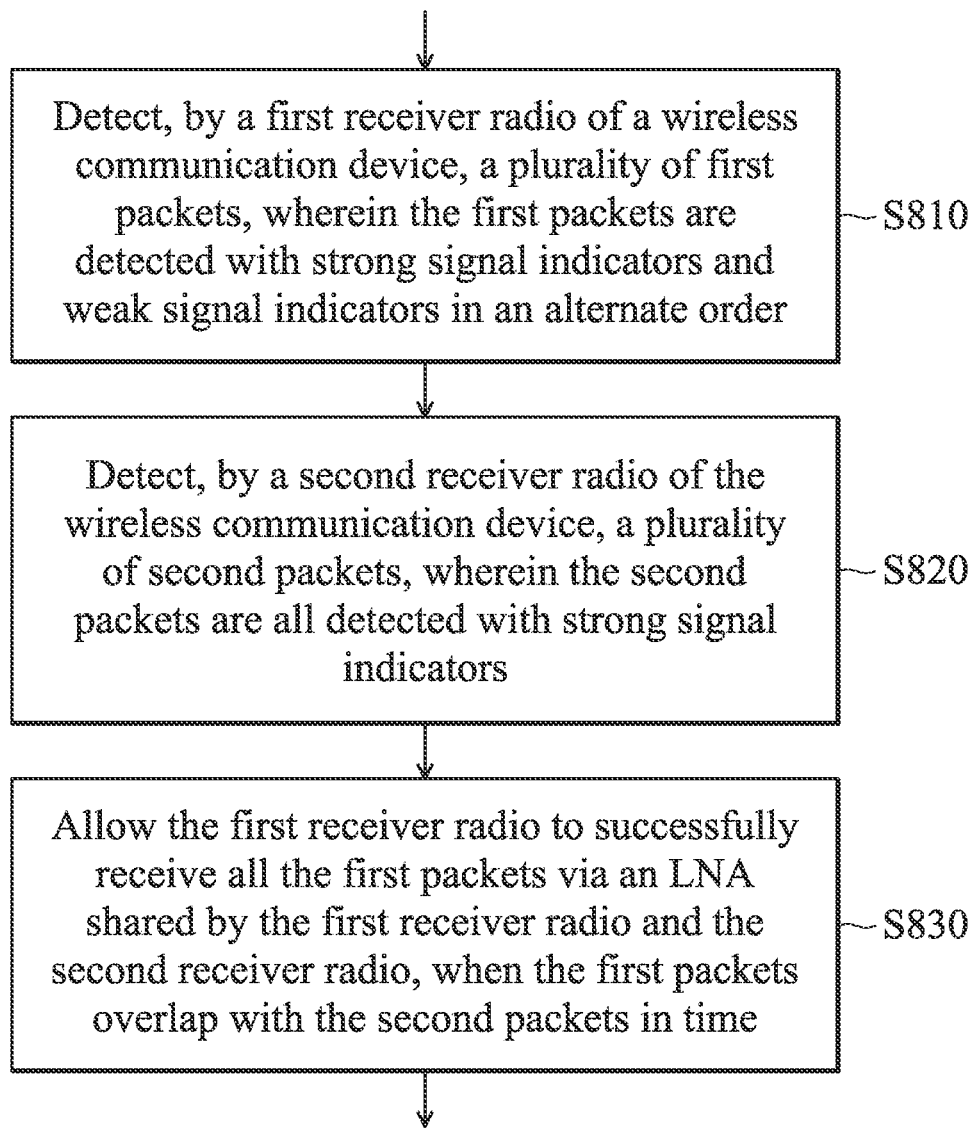
FIG. 8 is a flow chart illustrating the method for Co-Rx operation of multiple transceiver radios sharing the same antenna and LNA according to another embodiment of the application.

FIG. 8 is a flow chart illustrating the method for Co-Rx operation of multiple transceiver radios sharing the same antenna and LNA according to another embodiment of the application.

In step S810, a first receiver radio of a wireless communication device detects a plurality of first packets, wherein the first packets are detected with strong signal indicators and weak signal indicators in an alternate order. In one example, the first receiver radio may be a Wi-Fi receiver radio, and the first packets may include Wi-Fi packets with SN=1, 3, 5 being detected with strong RSSIs and Wi-Fi packets with SN=2, 4, 6 being detected with weak RSSIs.

In step S820, a second receiver radio of the wireless communication device detects a plurality of second packets, wherein the second packets are all detected with strong signal indicators. In one example, the second receiver radio may be a BT receiver radio, and the second packets may be BT scan response packets detected with strong RSSIs.

In step S830, the first receiver radio is allowed to successfully receive all the first packets via an LNA shared by the first receiver radio and the second receiver radio, when the first packets overlap with the second packets in time. Specifically, the LNA is configured to operate in the low-gain mode for receiving the first packets with strong signal indicators, and to operate in the high-gain mode for receiving the first packets with weak signal indicators.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method used for a wireless communication device, comprising:
   determining a first gain mode of a Low Noise Amplifier (LNA) based on a first signal indicator;
   determining a second gain mode of the LNA based on a second signal indicator, wherein the LNA is shared by a first receiver radio and a second receiver radio and is coupled to an antenna; and
   configuring, by a Packet Traffic Arbitration (PTA) circuitry of the wireless communication device, the LNA to operate in the first gain mode or the second gain mode based on priority levels of the first receiver radio and the second receiver radio;
   wherein the first signal indicator is a Received Signal Strength Indicator (RSSI), a Signal-to-Noise Ratio (SNR), or a Packet Error Rate (PER) of a Wi-Fi packet detected by the first receiver radio.

2. The method as claimed in claim 1, further comprising:
granting, by the PTA circuitry, only the first receiver radio to access the LNA in response to the LNA being configured to operate in the first gain mode; and
granting, by the PTA circuitry, only the second receiver radio to access the LNA in response to the LNA being configured to operate in the second gain mode.

3. The method as claimed in claim 1, wherein the configuring of the LNA to operate in the first gain mode or the second gain mode comprises:
configuring, by the PTA circuitry, the LNA to switch to the first gain mode in response to the priority level of the first receiver radio being higher than the priority level of the second receiver radio;
configuring, by the PTA circuitry, the LNA to switch to the second gain mode in response to the priority level of the second receiver radio being higher than the priority level of the first receiver radio; and
configuring, by the PTA circuitry, the LNA to stay in its current gain mode whether it be the first gain mode or the second gain mode, in response to the priority level of the first receiver radio being equal to the priority level of the second receiver radio.

4. The method as claimed in claim 1, wherein the configuring of the LNA to operate in the first gain mode or the second gain mode is performed in response to the first gain mode being different from the second gain mode.

5. The method as claimed in claim 1, further comprising:
granting, by the PTA circuitry, both the first receiver radio and the second receiver radio to access the LNA simultaneously, in response to the first gain mode being the same as the second gain mode.

6. The method as claimed in claim 1, wherein the first receiver radio is a Wireless-Fidelity (Wi-Fi) receiver radio, and the second receiver radio is a Bluetooth (BT) receiver radio.

7. The method as claimed in claim 6, wherein the second signal indicator is an RSSI, an SNR, or a PER of a BT packet detected by the second receiver radio.

8. The method as claimed in claim 1, wherein the determining of the first gain mode and the second gain mode and the configuring of the LNA to operate in the first gain mode or the second gain mode are performed on a per-packet basis.

9. A wireless communication device, comprising:
an antenna;
a Low Noise Amplifier (LNA), coupled to the antenna;
a first receiver radio that determines a first gain mode of a Low Noise Amplifier (LNA) based on a first signal indicator;
a second receiver radio that determines a second gain mode of the LNA based on a second signal indicator, wherein the LNA is shared by the first receiver radio and the second receiver radio; and
a Packet Traffic Arbitration (PTA) circuitry that configures the LNA to operate in the first gain mode or the second gain mode based on priority levels of the first receiver radio and the second receiver radio, wherein the first signal indicator is a Received Signal Strength Indicator (RSSI), a Signal-to-Noise Ratio (SNR), or a Packet Error Rate (PER) of a Wi-Fi packet detected by the first receiver radio.

10. The wireless communication device as claimed in claim 9, wherein the PTA circuitry further grants only the first receiver radio to access the LNA in response to the LNA being configured to operate in the first gain mode, and grants only the second receiver radio to access the LNA in response to the LNA being configured to operate in the second gain mode.

11. The wireless communication device as claimed in claim 9, wherein the configuring of the LNA to operate in the first gain mode or the second gain mode comprises:
configuring, by the PTA circuitry, the LNA to switch to the first gain mode in response to the priority level of the first receiver radio being higher than the priority level of the second receiver radio;
configuring, by the PTA circuitry, the LNA to switch to the second gain mode in response to the priority level of the second receiver radio being higher than the priority level of the first receiver radio; and
configuring, by the PTA circuitry, the LNA to stay in its current gain mode whether it be the first gain mode or the second gain mode, in response to the priority level of the first receiver radio being equal to the priority level of the second receiver radio.

12. The wireless communication device as claimed in claim 9, wherein the configuring of the LNA to operate in the first gain mode or the second gain mode is performed in response to the first gain mode being different from the second gain mode.

13. The wireless communication device as claimed in claim 9, wherein the PTA circuitry further grants both the first receiver radio and the second receiver radio to access the LNA simultaneously, in response to the first gain mode being the same as the second gain mode.

14. The wireless communication device as claimed in claim 9, wherein the first receiver radio is a Wireless-Fidelity (Wi-Fi) receiver radio, and the second receiver radio is a Bluetooth (BT) receiver radio.

15. The wireless communication device as claimed in claim 14, wherein the second signal indicator is an RSSI, an SNR, or a PER of a BT packet detected by the second receiver radio.

16. The wireless communication device as claimed in claim 9, wherein the determining of the first gain mode and the second gain mode and the configuring of the LNA to operate in the first gain mode or the second gain mode are performed on a per-packet basis.

* * * * *